US012325256B1

(12) United States Patent
Kalina

(10) Patent No.: US 12,325,256 B1
(45) Date of Patent: Jun. 10, 2025

(54) REUSABLE MARKER WITH SELF-REPLACING NIB

(71) Applicant: Shawn Kalina, Albuquerque, NM (US)

(72) Inventor: Shawn Kalina, Albuquerque, NM (US)

(73) Assignee: Shawn Kalina, Mesilla Park, NM (US)

( * ) Notice: Subject to any disclaimer, the term of this patent is extended or adjusted under 35 U.S.C. 154(b) by 92 days.

(21) Appl. No.: 18/535,265

(22) Filed: Dec. 11, 2023

(51) Int. Cl.
*B43K 3/04* (2006.01)
*B43K 8/02* (2006.01)
*B43K 15/00* (2006.01)

(52) U.S. Cl.
CPC ................ *B43K 3/04* (2013.01); *B43K 8/026* (2013.01); *B43K 15/00* (2013.01)

(58) Field of Classification Search
CPC .......... B43K 1/003; B43K 1/006; B43K 1/12; B43K 8/003; B43K 8/02; B43K 15/00
See application file for complete search history.

(56) References Cited

U.S. PATENT DOCUMENTS

| | | | | |
|---|---|---|---|---|
| 3,446,563 | A * | 5/1969 | Burnham | B43K 8/022 401/199 |
| 3,814,526 | A * | 6/1974 | Lotfallah | B43K 1/12 401/199 |
| 9,815,317 | B2 * | 11/2017 | Bezuhly | B43K 1/12 |
| 11,472,219 | B2 * | 10/2022 | Skinner | B43K 11/005 |
| 2008/0166177 | A1 | 7/2008 | Alghabban | |
| 2023/0133997 | A1 | 5/2023 | Mefford et al. | |
| 2023/0302843 | A1 | 9/2023 | Ovvadias | |

* cited by examiner

*Primary Examiner* — David P Angwin
*Assistant Examiner* — Bradley S Oliver

(57) ABSTRACT

A marker and nib assembly that allows for multiple uses before needing to replace the nib. The present invention comprises a nib, a marker body, a marker neck, and a pin. The nib further comprises a plurality of holes allowing the nib to be adjusted and reused multiple times. When the nib is worn out, it can be raised to align with the next hole, and the excess material can be cut off.

7 Claims, 6 Drawing Sheets

REUSABLE MARKER WITH SELF-REPLACING NIB

FIELD OF THE INVENTION

The present invention relates generally to markers, particularly markers used for carpentry or other industrial purposes. More specifically, the present invention relates to a reusable marker with a self-replacing nib.

BACKGROUND OF THE INVENTION

Markers serve a variety of purposes in carpentry and other industrial fields. They can be used to label cans and boxes; draw on various materials such as wood, tile, glass, or metal; or mark off measurements. All markers eventually dry or wear out, in which case a new marker is required. The prior art includes markers with replaceable nibs. When the nib dries or wears out, the same marker body can be reused, and a new nib can be put in.

The marker of the present invention seeks to improve upon the prior art by providing a marker with a self-replacing nib. This ensures that more of the nib is used, resulting in a marker that lasts longer before wearing out. The nib of the present invention can then be replaced in a similar way to the prior art, but with many more uses before the need to completely replace the nib arises.

SUMMARY OF THE INVENTION

The marker of the present invention has a replaceable nib that can be divided or cut into segments. The nib has several holes which can be used to hold the nib in position within the marker body. Once the nib has worn down to the top of one hole, the rest of that segment can be cut off, and the next hole can be used to provide a "new" nib.

DETAILED DESCRIPTION OF THE INVENTION

All illustrations of the drawings are for the purpose of describing selected versions of the present invention and are not intended to limit the scope of the present invention.

Figure 1:
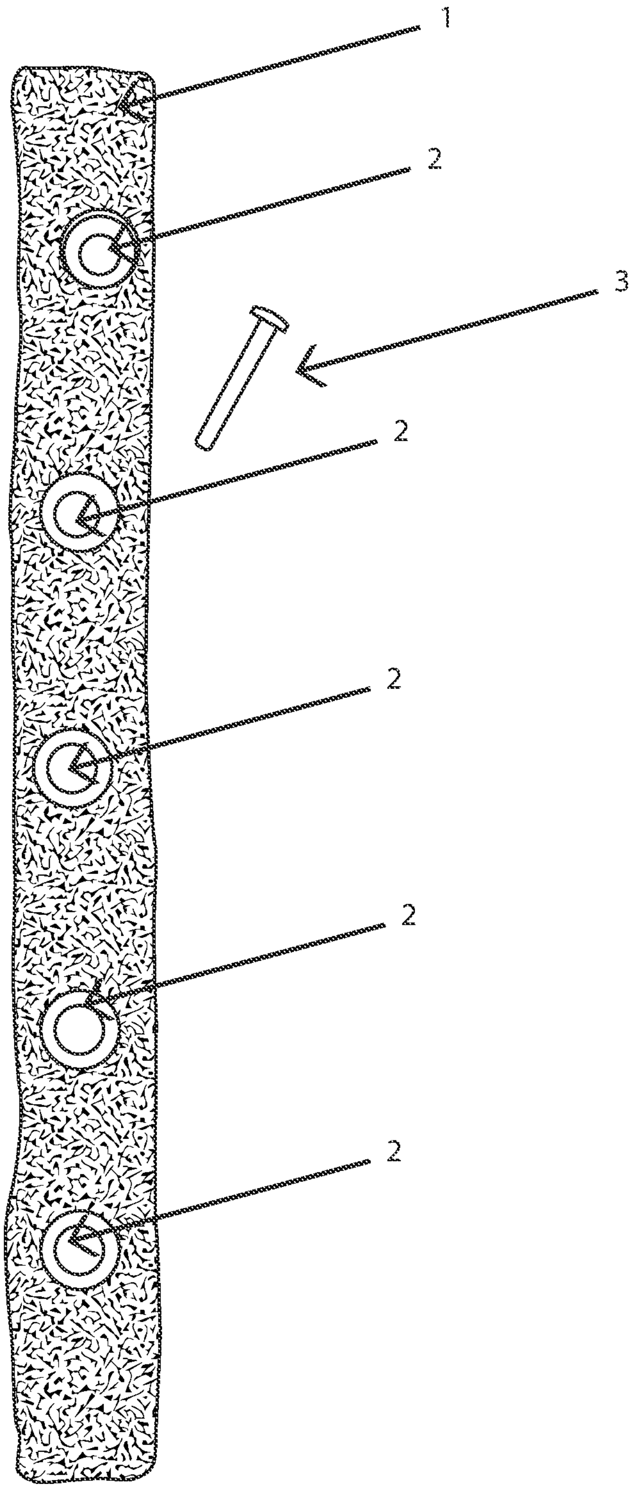
FIG. 1 is a view of the nib of the present invention, comprising a plurality of holes and a pin which fits into the holes.

The present invention is a marker and nib assembly comprising a marker nib 1, marker neck 4, a marker body 5, and a connecting pin 3. As shown in FIG. 1, the marker nib 1 further comprises a plurality of holes 2 spaced along the nib 1. The holes 2 have grommets placed within for stability.

Figure 2:
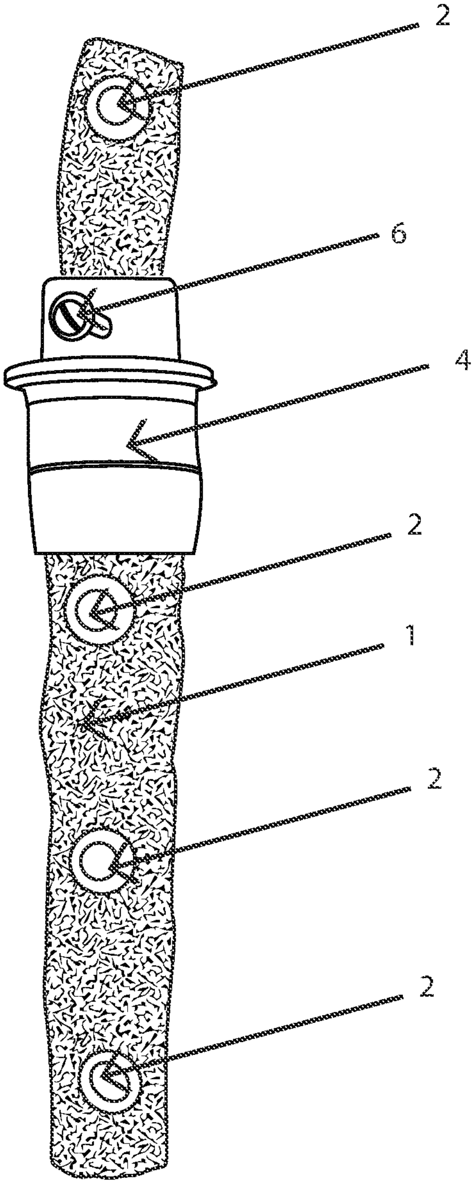
FIG. 2 is a view of the nib when inserted into the neck of the marker, which also comprises a hole. The pin is placed through both the hole in the neck and the hole in the nib to secure the nib in place.
Figure 3:
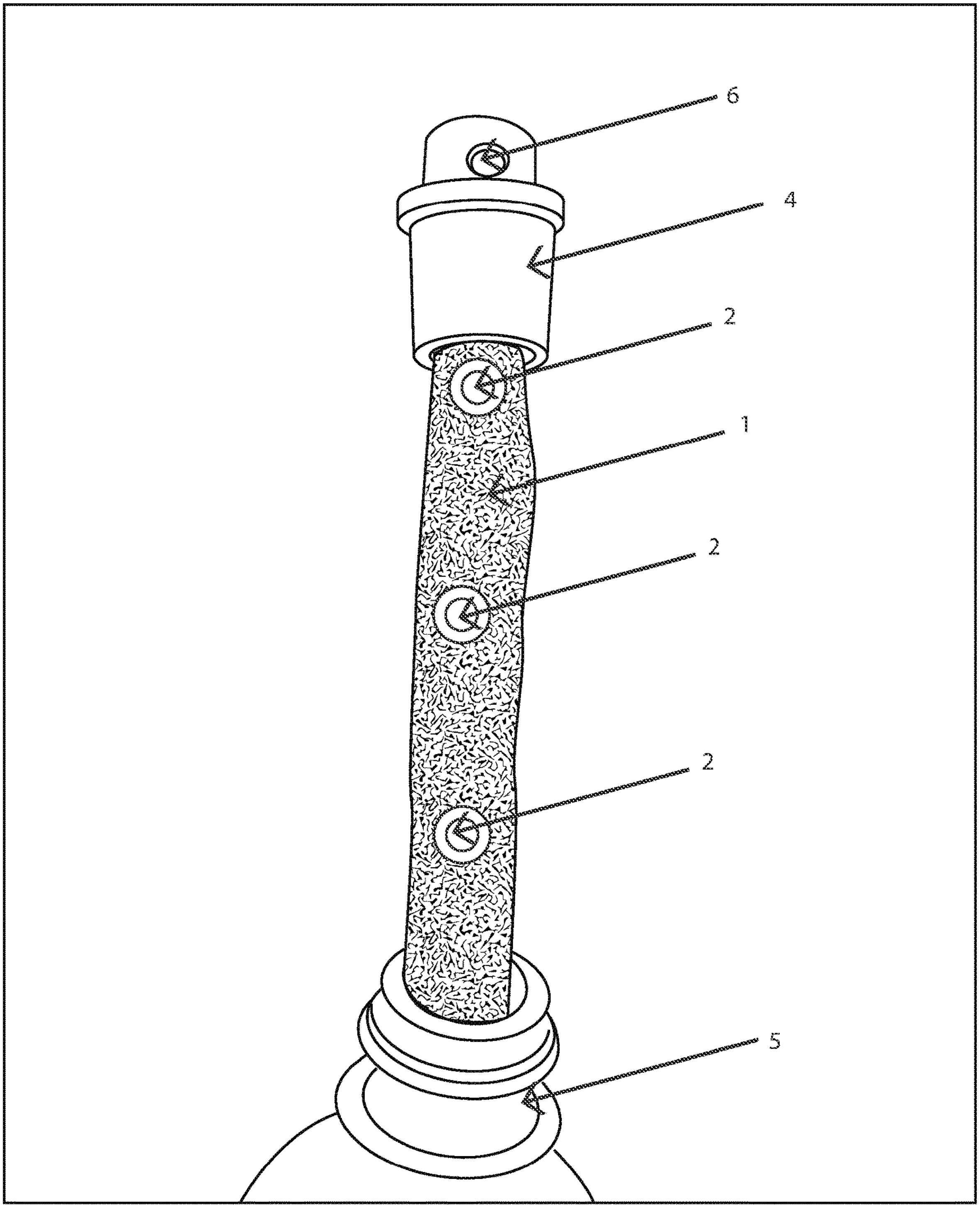
FIG. 3 is a view of the marker and nib assembly when being prepared for use. The nib is placed into the body of the marker, and the neck is placed over the nib where it can then slide into the correct position and attach to the body.

The marker neck 4, as shown in FIG. 2, is a piece of plastic or other solid material shaped to be placed around the nib 1. At the top of the neck 4 is a hole 6 with the same diameter as the holes 2 on the nib. This allows a pin 3 to be placed through both the hole of the neck 6 and the hole in the nib 2 to secure it in place.

Figure 4:
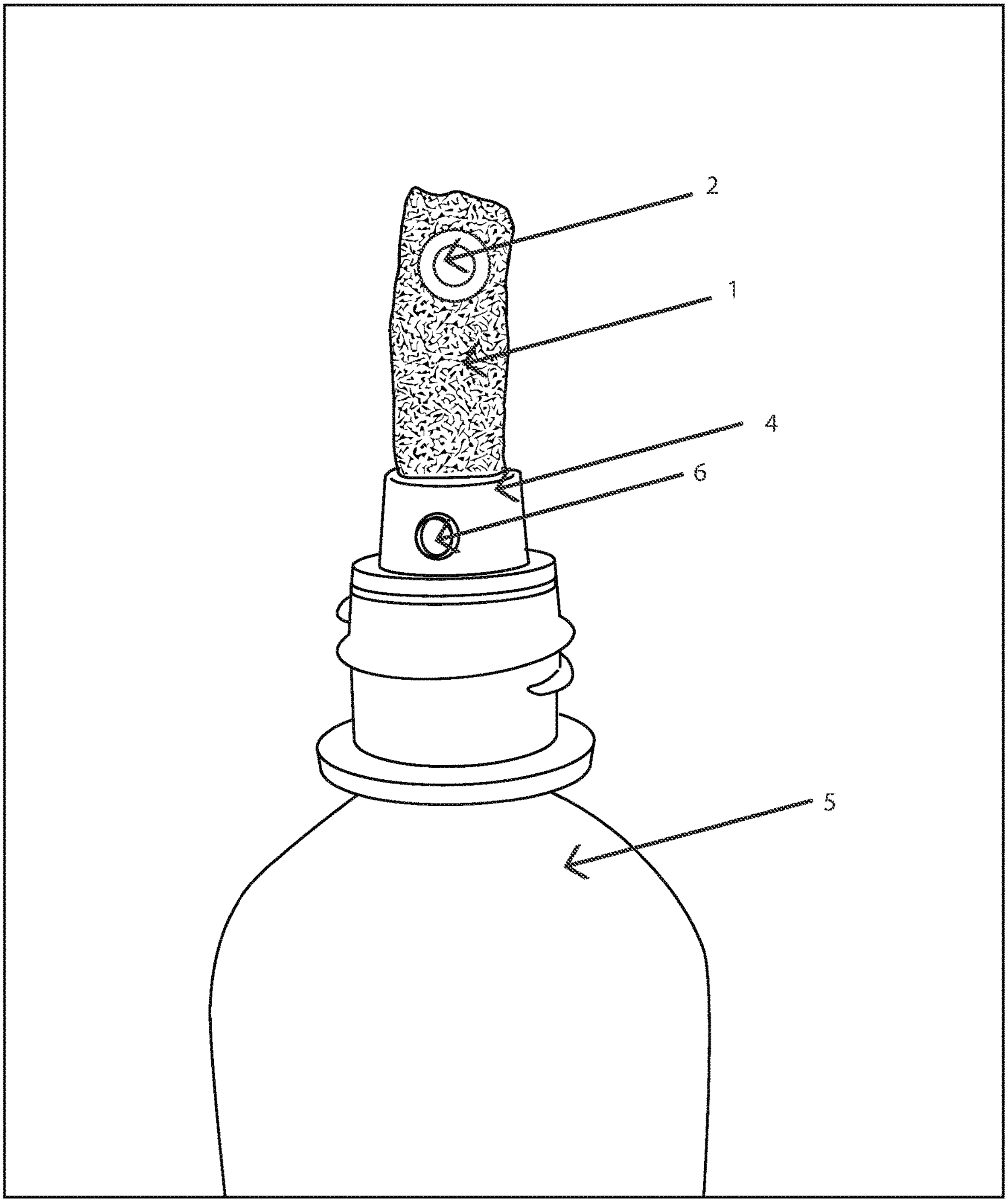
FIG. 4 is another view of the marker and nib assembly when being prepared for use. The neck and body of the marker are connected, and the holes are aligned so that the pin can be placed through them.
Figure 5:
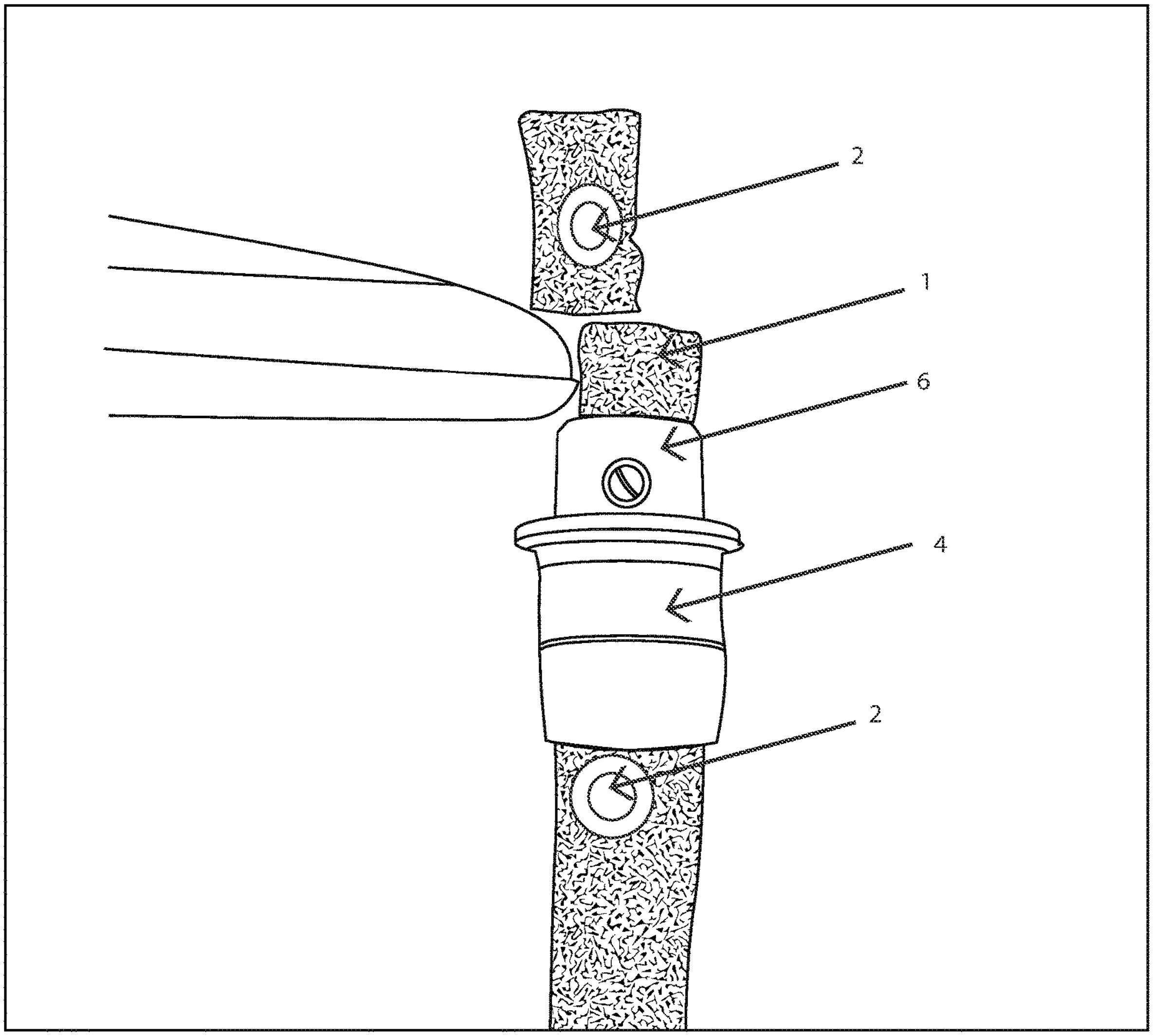
FIG. 5 shows how the nib replaces itself. Scissors or any other cutting device can be used to cut off the piece of the nib which can no longer be used by cutting below the hole. The new segment is then ready for use.
Figure 6:
FIG. 6 is a view of the marker and nib assembly when ready for use. The body and neck of the marker are connected, the pin has secured the nib in place, and a fresh segment of the nib is ready to be used.

The marker body 5, as shown in FIG. 4, is a hollow piece of plastic or other solid material shaped to contain the nib 1. The neck 4 and body 5 of the marker are manufactured to be connected, as shown in FIG. 6. In the preferred embodiment, the neck 4 screws into the body 5, but other means of connecting the parts are further contemplated.

The present invention further comprises a pin 3, which is placed through the holes 2 in the nib 1 and the hole 6 in the neck 4. The complete assembly is shown in FIG. 6.

Upon first use, a user can use the marker until the nib 1 is worn down to the neck 4. The user can then remove the pin 3 and unscrew the neck 4. The user can then raise the nib 1 within the body 5 in order to align the next hole 2. The user can then replace the neck 4 and reinsert the pin 3 into the newly aligned hole. The previous hole 2 that was used will now be at the top of the nib 1, as shown in FIG. 4. The user can cut the nib 1 just below the hole 2, and a new segment of the nib 1 will be ready for use, as shown in FIG. 6.

Although the invention has been explained in relation to its preferred embodiment, it is to be understood that many other possible modifications and variations can be made without departing from the spirit and scope of the invention.

What is claimed is:

1. A self-replacing marker and nib assembly comprising,
a marker nib comprised of a plurality of holes spaced along the length with grommets
placed within;
a marker neck;
a marker body;
and a pin.

2. The marker and nib assembly of claim 1, wherein the marker neck is a rounded and hollow length of plastic or another suitable solid material, said neck further comprising a hole near the top of the neck through which the pin can be placed.

3. The marker and nib assembly of claim 1, wherein the marker neck further comprises a mechanism by which the neck attaches to the body, such as spiraling grooves along the outside of the neck allowing the neck to be screwed into said body.

4. The marker and nib assembly of claim 1, wherein the marker body is a rounded and hollow length of plastic or another suitable solid material, said body further comprising a mechanism by which the neck is attached, such as spiraling grooves along the inside of the body allowing the neck to be screwed into said body.

5. The marker and nib assembly of claim 1, wherein the pin is manufactured to be inserted through the holes of both the nib and the neck, said pin further comprising a cap or locking mechanism allowing it to hold the nib in place.

6. A method of using a self-replacing marker and nib assembly: placing the neck over the nib; aligning the hole in the nib with the hole in the neck; placing the pin through the aligned holes; securing the pin; inserting the nib into the body; lowering the nib and attached neck into the body;

connecting the neck to the body; and cutting off excess or unusable nib material protruding from the assembled marker.

7. The method of claim 6, further comprising: when the nib is worn down to the neck, disconnecting the neck from the body; removing the pin; pulling the remaining nib material partially out of the neck until the next hole is in the proper location; aligning the hole in the nib with the hole in the neck; placing the pin through the aligned holes; securing the pin; lowering the nib and attached neck; and reconnecting the neck to the body.

* * * * *